US012461493B2

(12) United States Patent
Willemin et al.

(10) Patent No.: US 12,461,493 B2
(45) Date of Patent: Nov. 4, 2025

(54) TIMEPIECE WITH LOCALIZED ILLUMINATION

(71) Applicant: The Swatch Group Research and Development Ltd, Marin (CH)

(72) Inventors: Michel Willemin, Prêles (CH); Loïc Curchod, Lausanne (CH); Pierpasquale Tortora, Neuchâtel (CH); Simon Springer, Berne (CH); Cédric Faure, Cortaillod (CH)

(73) Assignee: The Swatch Group Research and Development Ltd, Marin (CH)

(*) Notice: Subject to any disclaimer, the term of this patent is extended or adjusted under 35 U.S.C. 154(b) by 443 days.

(21) Appl. No.: 17/717,251

(22) Filed: Apr. 11, 2022

(65) Prior Publication Data

US 2022/0390898 A1 Dec. 8, 2022

(30) Foreign Application Priority Data

Jun. 8, 2021 (EP) .................................... 21178245

(51) Int. Cl.
*G04B 19/30* (2006.01)
*G04B 19/32* (2006.01)
*G04G 9/00* (2006.01)

(52) U.S. Cl.
CPC ............. *G04B 19/30* (2013.01); *G04B 19/32* (2013.01); *G04G 9/0064* (2013.01)

(58) Field of Classification Search
None
See application file for complete search history.

(56) References Cited

U.S. PATENT DOCUMENTS 4,502,791 A * 3/1985 Goy ........................ G04B 37/10 368/308
4,993,005 A * 2/1991 Watanabe ............ G04B 19/305 368/226

(Continued)

FOREIGN PATENT DOCUMENTS

CH 705 956 B1 7/2013
CN 201 218 902 Y 4/2009

(Continued)

OTHER PUBLICATIONS

Translation of EP3502792, Espacenet (Year: 2019).*
European Search Report for EP 21 17 8245, dated Nov. 18, 2021.

*Primary Examiner* — Renee S Luebke
*Assistant Examiner* — Matthew Daniel Hwang
(74) *Attorney, Agent, or Firm* — Sughrue Mion, PLLC

(57) ABSTRACT

The invention relates to a timepiece including, in addition to a crystal (34), the following external elements: a back (2), a middle (1), a dial (3) and two bracelet strands (30), at least one of these external elements comprising at least one part made of an at least partially transparent or translucent ceramic material, the timepiece further including at least two point light sources (10) releasing heat, each light source (10) being capable of being separately switched on/off and being disposed in or directly beneath said at least one external element comprising the ceramic material, each light source (10) producing light that passes through the ceramic material of said external element, and wherein each light source (10) is configured to produce localised light on a point or quasi-point area (40) of the ceramic material of the external element concerned, so as to produce localised illumination on said external element.

17 Claims, 2 Drawing Sheets

(56) References Cited

U.S. PATENT DOCUMENTS

| | | | | |
|---|---|---|---|---|
| 2006/0038187 | A1 * | 2/2006 | Ueno .................... | H01L 33/508<br>257/E33.059 |
| 2007/0274160 | A1 | 11/2007 | Behling et al. | |
| 2011/0182151 | A1 | 7/2011 | Geyer et al. | |
| 2012/0082012 | A1 | 4/2012 | Blanckaert et al. | |
| 2015/0029829 | A1 | 1/2015 | Spadini | |
| 2015/0117162 | A1 * | 4/2015 | Tsai ....................... | G04G 9/124<br>368/29 |

FOREIGN PATENT DOCUMENTS

| | | | |
|---|---|---|---|
| CN | 102 576 783 | A | 7/2012 |
| EP | 2 392 977 | A1 | 12/2011 |
| EP | 2 874 024 | A1 | 5/2015 |
| EP | 3 045 505 | A1 | 7/2016 |
| EP | 3 070 539 | A1 | 9/2016 |
| EP | 3502792 | A1 * | 6/2019 |
| EP | 3 796 103 | A1 | 3/2021 |
| JP | 7-294668 | A | 11/1995 |
| JP | 2008-544268 | A | 12/2008 |
| JP | 2010-528269 | A | 8/2010 |
| JP | 2013-501210 | A | 1/2013 |
| WO | 2020/065472 | A1 | 4/2020 |

* cited by examiner

TIMEPIECE WITH LOCALIZED ILLUMINATION

CROSS REFERENCE TO RELATED APPLICATIONS

This application claims priority to European Patent Application No. 21178245.3 filed Jun. 8, 2021, the entire contents of which are incorporated herein by reference.

TECHNICAL FIELD OF THE INVENTION

The present invention relates to a timepiece with localised illumination. More specifically, the present invention relates to a timepiece with original localised light effects, for functional, aesthetic and/or amusement purposes. The present invention further relates to use of such a timepiece to obtain novel, original functional applications for illuminations on the timepiece.

TECHNOLOGICAL BACKGROUND

Creating timepieces such as wristwatches with an improved aesthetic appearance is a constant concern for watch manufacturers and in particular for those responsible for designing the various external elements. It would take too long to list here all the solutions that have been considered to give a timepiece as meticulous and aesthetic an appearance as possible. Examples include the engine-turning technique for dials, the shape and/or colour of the appliques of the dial or the hands, or the addition of precious or semi-precious stones.

The present invention is part of the search to provide customers with watches that are aesthetically pleasing, surprising and functional at the same time.

In this context, the illumination of a timepiece in which at least one external element is at least partially transparent or translucent is known, for example from the international patent WO 2010/146162 A1. The timepiece, which is typically a watch, includes one or more light sources that allow the external element of the watch to be illuminated from within the case, beneath the dial, by producing light that passes through the transparent or translucent part of this external element. The lateral periphery of the middle of the watch, areas around the winding button and/or push-buttons, or optical elements towards the bracelet strands can thus be illuminated. The dial can also be illuminated via selectively semi-transparent areas (appliques) provided thereon.

However, one drawback of this type of timepiece is that it is limited to achieving an overall special aesthetic effect, optionally allowing the time and date to be read at night by the direct or indirect illumination of the position of the hands and of the date display. In particular, such a timepiece does not allow information located at a single point or at multiple discrete points of the timepiece to be indicated by means of a luminous display in an aesthetic manner.

SUMMARY OF THE INVENTION

The invention overcomes the drawbacks of the prior art by providing a timepiece with localised illumination at multiple points on the timepiece, which is simple to produce and which has original, localised light effects for functional, aesthetic and/or amusement purposes.

To this end, the present invention relates to a timepiece including, in addition to a crystal, the following external elements: a back, a middle, a dial and two bracelet strands, at least one of these external elements comprising at least one part made of an at least partially transparent or translucent ceramic material, the timepiece further including at least two point light sources releasing heat, each light source being capable of being separately switched on/off and being disposed in or directly beneath said at least one external element comprising the ceramic material, each light source producing light that passes through the ceramic material of said external element. According to the invention, each light source is configured to produce localised light on a point or quasi-point area of the ceramic material of the external element concerned, so as to produce localised illumination on said external element.

The use of an at least partially transparent or translucent ceramic material, combined with the fact that each light source is configured to produce localised light on a point or quasi-point area of this ceramic material, allows a timepiece to be produced with localised illumination, which is simple to manufacture and which is illuminated from within the timepiece at several points thereof, for functional purposes (in particular for displaying information that is normally hidden), aesthetic purposes and/or amusement purposes. Moreover, the illumination has a more or less diffuse, discreet, soft and pleasant appearance, which features can be varied almost endlessly depending on the desired aesthetic outcome, thus increasing the final aesthetic quality of the timepiece. The timepiece according to the invention can, for example, be an electronic, electromechanical and/or mechanical watch, and in particular a sports watch or a so-called “luxury” watch.

Depending on the watch models considered (in particular those incorporating pre-existing ceramic external elements), the present invention has the additional advantage of being able to be implemented while modifying only internal components of the watch case (steel centre, back, etc.), without having to insert complex structures into the ceramic external elements. This allows the illumination features according to the invention to be incorporated into existing watch models without having to modify the injection moulds.

Specific embodiments of the timepiece are defined in the dependent claims 2 to 16.

According to a first embodiment of the invention, each point light source is a quantum box or quantum dot.

According to a second embodiment of the invention, each point light source is a light-emitting diode mounted on a printed circuit board-type support, preferably on a flexible printed circuit board. Each point light source is powered, for example, by a replaceable or rechargeable battery or by a solar cell.

According to a first alternative embodiment, each light-emitting diode is a surface-mount device (SMD), preferably a surface-mount device (SMD) that is encapsulated and/or surface-welded.

According to a second alternative embodiment, each light-emitting diode is a light-emitting diode chip on a printed circuit board, preferably a light-emitting diode chip provided with a transparent impregnation material.

Advantageously, the timepiece further includes an electronic control circuit for controlling the light-emitting diodes, said electronic control circuit being configured to control each light-emitting diode independently from the other diodes. The electronic control circuit controls the switching of the light-emitting diodes according to the chosen function, or on request from the user via an action carried out on a button or on the winding button of the winding mechanism, or on a touch-sensitive area of the timepiece.

According to one alternative embodiment of the invention, each point light source is disposed on an internal surface of the external element to be illuminated. This allows each point light source to be brought closer to the external surface of the external element to be illuminated, for a more aesthetic illumination.

According to another alternative embodiment of the invention, at least two internal recesses are made in the external element to be illuminated, each point light source being disposed in one of said internal recesses. This again allows each point light source to be brought closer to the external surface of the external element to be illuminated. The internal recesses can be made in the injection mould of the timepiece or machined after the sintering thereof.

Advantageously, the thickness of the external element to be illuminated is chosen such that each point light source disposed in or directly beneath said external element is invisible when the light source is switched off. This further improves the aesthetic quality and discretion of the illumination, and thus improves the aesthetic appearance of the timepiece.

Advantageously, the external element to be illuminated is the middle of the timepiece, and the thickness of the middle is comprised between 1 mm and 5 mm, preferably less than 2 mm. Such a thickness provides particularly effective illumination of the middle.

Advantageously, each point light source is mounted on a moving part of the timepiece, beneath the external element to be illuminated, for example mounted on a pseudo-hand configured to rotate about the axis of the hands. This makes it possible to obtain a dynamic and particularly aesthetic illumination effect, in particular when the external element to be illuminated is the middle or the bezel of the watch.

According to a specific technical feature of the invention, the point light sources are configured such that each point or quasi-point area of the ceramic material that can be illuminated is capable of being illuminated by a single monochromatic point light source.

According to another specific technical feature of the invention, the point light sources are configured such that each point or quasi-point area of the ceramic material that can be illuminated is capable of being illuminated by a plurality of point light sources with different light colours. This allows a plurality of colours to be emitted at each illuminated point or quasi-point of the external element.

Another aspect of the invention relates to the use of a timepiece as described hereinabove, wherein the switching on and off of the point light sources releasing heat is configured such that the timepiece has, on the external element illuminated by the point light sources, at least one visual indication of a function specific to the timepiece and/or relating to a measurement of an external parameter or of a parameter concerning the user of the timepiece.

According to a specific technical feature of the invention, the switching on and off of the point light sources is configured such that the timepiece has, on the external element illuminated by the point light sources, one or more visual indications relating to one or more of the following functionalities: indication of the hour, minutes and/or date; indication of a stopwatch or a countdown timer with point or quasi-point luminous areas of the external element which light up, or go out respectively, as the time elapses; indication of a quantity measured by the timepiece by colour-, rhythm-, frequency- and/or intensity-modulated illumination on the external element, for example indication of a heart rate, a temperature, a running pace, a number of steps or a decibel level; indication of an alarm or notification received; indication of an active function for the timepiece; timepiece setting aid.

According to another specific technical feature of the invention, the switching on and/or off of the point light sources is controlled simultaneously and/or sequentially.

BRIEF DESCRIPTION OF THE FIGURES

The purposes, advantages and features of the timepiece according to the invention will appear more clearly in the following description which is given on the basis of at least one non-limiting embodiment shown by way of the drawings, in which.

DETAILED DESCRIPTION OF THE INVENTION

The present invention was drawn from the general inventive idea consisting of housing at least two point light sources in or beneath at least one external element of a timepiece comprising a transparent or translucent ceramic material, the light, also referred to as light radiation or visible light, produced by each point light source being localised on a point or quasi-point area of the ceramic material of the external element concerned, so as to produce a localised illumination on said external element. It should be noted that each point light source is capable of releasing heat, in particular by the Joule effect. This thus provides a timepiece with localised illumination at multiple points on the timepiece, which is simple to produce and which has original, localised light effects for functional, aesthetic and/or amusement purposes. Moreover, the light source is said to be a point light source as opposed to an area light source. This point source is configured to emit light that appears to be concentrated in a pin point.

When the illumination is switched on, the light areas on the external element transmit a more or less hard and diffuse light depending on the construction and the installed lighting power, thus creating surprising functional, aesthetic and/or amusing effects in contrast to the unlit parts of the external element.

In the timepiece, the external element is preferably a one-piece part. In an alternative embodiment, the external element is preferably a one-piece ceramic part.

A "point or quasi-point area" is understood to mean any localised area on the ceramic material of the external element concerned with dimensions such that it is perceived as separate from neighbouring areas by the human eye.

In the description hereinbelow, all parts of the timepiece that are well known to a person skilled in the art will only be explained in a simplified manner.

Figure 1:
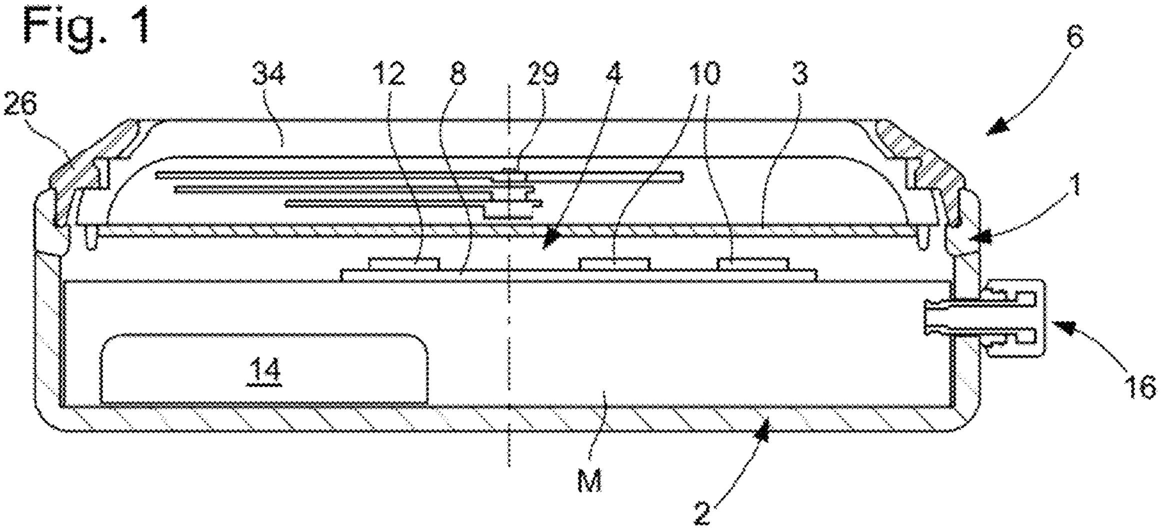
FIG. 1 is a sectional view of a watch case according to one embodiment of the invention, the watch case being equipped with two point light sources.

FIG. 1 is a sectional view of a middle 1 which, together with a back 2 and a dial 3, delimits an internal volume 4 of a watch case 6. The watch case 6 is closed at the top by a crystal 34. For the purposes of this description, it will be assumed that the watch is an electronic watch and that the movement M thereof is disposed in the back of the watch case 6. In this way, a support plate 8 of the printed circuit board or PCB type can be disposed above the movement M, on which PCB two point light sources 10, for example of the light-emitting diode or LED type, and their electronic control circuit 12 are mounted. The light emitted by each point light source 10 illuminates a point or quasi-point area of the external element to be illuminated, i.e. the dial 3 in the specific embodiment shown in FIG. 1. For this purpose, the light emitted by each point light source 10 can, for example, be collimated or focused towards the point or quasi-point area in question, in which case this light source comprises a collimating or focusing element. Each light source can further comprise an element that conducts its radiation.

In the specific embodiment shown in FIG. 1, each point light source 10 is disposed directly beneath the external element, for example the dial 3 to be illuminated. The light source is thus positioned by pressing, bonding, or by any other type of means, onto an internal surface of this external element where the point or quasi-point area is to be located. It is also possible, according to an alternative embodiment not shown, for each point light source 10 to be mounted on a moving part of the timepiece, directly beneath the external element to be illuminated. For example, when the external element to be illuminated is a bezel 26 mounted on the middle 1, each point light source 10 can be mounted on a pseudo-hand configured to rotate about the axis of the hands 29. It should be noted that "directly beneath said external element" must be understood to mean that each light source is disposed:

- in the immediate vicinity of the internal surface of this external element where the point or quasi-point area is located, without any intermediate element being disposed in the space defined between this light source and this internal surface in this configuration;
- in contact with the internal surface of this external element where the point or quasi-point area is located.

According to an alternative embodiment, each point light source 10 is disposed partly or entirely within the external element to be illuminated. In this precise case, at least two internal recesses are made in the external element to be illuminated, each point light source 10 being disposed in one of the internal recesses. These internal recesses are cavities or blind holes. In this configuration, the opening of each recess (or blind hole) lies in the internal surface of the external element. These internal recesses can be made in the injection mould of the external element or machined after the sintering thereof. It should be noted that these recesses are located in the point or quasi-point area.

Any type of point light source 10 that releases heat by Joule effect, such as a light-emitting diode or similar, can be used. In one specific embodiment of the invention, light-emitting diodes, each emitting ultraviolet, violet, blue, white or infrared light are used, in combination with an external element comprising an at least partially transparent or translucent ceramic material loaded with fluorescent and/or phosphorescent particles. The external element is loaded at the one or more locations where light is intended to escape from within the watch case 6. In this way, the fluorescent and/or phosphorescent particles absorb the radiation emitted by each diode and re-emit homogeneous visible light. Depending on the type of particles chosen, namely fluorescent and/or phosphorescent particles, the luminous effect ceases immediately after the light source is switched off or continues due to the afterglow effect. Alternatively, but not shown in the figures, the point light sources 10 can be quantum boxes or quantum dots.

In one specific embodiment of the invention, each point light source 10 is a monochromatic light source, and each point or quasi-point area that can be illuminated on the ceramic material of the external element is illuminated by a single monochromatic point light source 10. In another embodiment of the invention, the point light sources 10 are configured to have different light colours, and each point or quasi-point area that can be illuminated on the ceramic material of the external element is illuminated by a plurality of these point light sources 10.

Preferably, the printed circuit board or PCB 8 is a flexible board. When the point light sources 10 are light-emitting diodes, they can be, for example, surface mount devices (SMDs), typically encapsulated and/or surface-welded; or light-emitting diode chips on a printed circuit board, typically provided with a transparent impregnation material. The control circuit 12 is configured to control the light-emitting diodes according to the chosen function for the timepiece, or on request from the user via an action thereof carried out on a push-button or on a winding button, or on a touch-sensitive area of the timepiece. Preferably, the electronic control circuit 12 is configured to control each light-emitting diode independently from the other diodes. In other words, the switching on and off of each point light source 10 is controlled separately by this electronic control circuit 12.

Each point light source 10 is powered by, for example, a rechargeable or replaceable battery 14 and is conventionally disposed beneath the watch movement M on the back 2 side of the watch case 6. It should be understood that the watch according to the invention can be electronic, electromechanical or even purely mechanical. In the latter case, a recess must simply be provided for a battery which will be intended to power the light sources 10 and their electronic control circuit 12 only. Thus, the present invention can be applied to any type of wristwatch, the only constraint being that there must be no obstacle preventing the propagation of light between the point light sources and the external element via which said light must emerge.

In the specific embodiment shown in FIG. 1, the external element via which said light must emerge is the dial 3, which is made of an at least partially transparent or translucent ceramic material. The present invention is, however, applicable to any other external element of a timepiece comprising a part made of an at least partially transparent or translucent ceramic material, such as, for example, the middle 1, the back 2, the bezel 26, a flange (not shown in the figures), or even bracelet strands 30 (shown in FIG. 2 to 4). According to one specific embodiment, the part of the external element made of ceramic material, which is intended to be illuminated, is an upper part of the middle 1 or of the bezel 26.

According to one embodiment of the invention not shown in the figures, a point or quasi-point area of a control member of the watch, such as a push-button 16, is illuminated, more specifically a part of this control member made of an at least partially transparent or translucent ceramic material. According to another embodiment of the invention, also not shown in the figures, at least one point or quasi-point area of a winding button, optionally provided with a button cap, is illuminated. In such a case, the winding button and/or the button cap comprises at least one part made of an at least partially transparent or translucent ceramic material.

The localised illumination is produced on at least one point or quasi-point area of this part of the winding button and/or button cap.

In an alternative embodiment not shown, the external element to be illuminated can include an insert made of an at least partially transparent or translucent ceramic material. The insert is provided at the one or more locations where light is intended to escape from within the watch case 6. The remainder of the external element is thus, for example, made of a material other than ceramic, typically an opaque material. It is also possible to provide external elements that mix multiple ceramic colours during the injection moulding process, in particular by means of bi-injection moulding processes, at least one of these multiple colours being partially transparent or translucent in order to allow light to pass therethrough at predetermined locations produced by the bi-injection moulding process.

According to one specific and advantageous embodiment of the invention, the thickness of the external element to be illuminated is chosen such that each point light source 10 disposed in or beneath the external element is invisible when the light source 10 is switched off. This greatly improves the aesthetic appearance of the timepiece. The emission power of the point light sources 10 can also be adapted and combined with the choice of thickness of the external element, so as to achieve such invisibility of the light sources 10 when they are switched off. This also makes it possible to make the illumination more or less diffuse or direct, and soft or hard, depending on the desired aesthetic effect. When the external element to be illuminated is the middle 1 of the timepiece, the thickness of the middle 1 is advantageously chosen to be comprised between 1 mm and 5 mm. Preferably, in order to obtain particularly effective illumination, the thickness of the middle 1 is less than 2 mm.

According to another embodiment of the invention, the point light sources 10 can be combined with one or more inscriptions I written in the ceramic material of the external element to be illuminated:

by varying the thickness of the ceramic by mechanical or laser etching (for example recessing some 0.1 mm into the ceramic),

- or by varying the density of the ceramic,
- or by an opaque or semi-transparent imprint on the inside or on the surface of the ceramic external element,
- or by physical vapour deposition (PVD) or similar, patterned on the inside or on the surface of the external element,
- or by a combination of these methods.

When the light emission of the point light sources 10 is switched on, the normally invisible inscription Lappears in negative on the surface of the ceramic material.

The timepiece according to the present invention can advantageously be used to provide various functional applications to a user of the timepiece. For this purpose, the switching on and off of each point light source 10 is controlled separately by the electronic control circuit 12. In other words, each light source can be switched on or off separately. To this end, the switching on and off of the point light sources 10 is configured such that the timepiece has, on the external element illuminated by the point light sources 10, at least one visual indication of a function specific to the timepiece and/or relating to a measurement of an external parameter or of a parameter concerning the user of the timepiece. The switching on and/or off of the point light sources 10 can be controlled by the electronic control circuit 12 simultaneously and/or sequentially.

Possible functional applications for the timepiece include, for example:

- indication of a quantity measured by the timepiece by colour-, rhythm-, frequency- and/or intensity-modulated illumination on the external element. For example:
  - indication of the user's heart rate by pulsed illumination at the same frequency. The colour of the illumination can also be varied according to the frequency, typically green for a low heart rate, then increasingly red as the heart rate rises;
  - indication of the ambient temperature by illuminating the digits or appliques 38 on the dial 3 in sequence, or their corresponding positions 40 on the circumference of the middle 1 and/or the bezel 26 (see FIG. 2), adapting the colour to the temperature (typically blue for low temperatures, and increasingly red for higher temperatures);
  - indication (absolute or relative) of the running pace for a sports watch;
  - indication of the number of steps or of any other measure of the user's sporting activity;
  - indication of a decibel level (for example on a building site, in a nightclub, etc.);
- indication of any type of alarm and use of different combinations of rhythms/intensities/colours for the different alarms. In such a case, many external elements of the timepiece can be illuminated simultaneously or sequentially, including the strap. Examples of alarms:
  - morning wake-up alarm;
  - message or e-mail received (or acknowledgement of receipt of a message sent) or any other notification from any other application for a watch connected to a mobile device of the mobile phone type;
  - acknowledgement of receipt for a payment for a watch with a contactless payment function;
- indication of the active function for a multitask watch, in particular the "Time", "Chrono" (for stopwatch), "Baro" (for barometer), "Podo" (for pedometer) functions, etc.:
  - by illumination of a digit or applique 38 on the dial 3 corresponding to the function (1=Stopwatch, 2=Barometer, etc.);
  - by transmission illumination of one or more inscriptions (for example small texts or logos) printed or etched inside the watch (typically in the middle 1 and/or the bezel 26), just below the surface, and which are invisible in the absence of illumination;
- watch setting aid, in particular for touch-sensitive watches where the watch is set without a push-button/winding button, which can make the operations less intuitive:
  - indication of the active settings level (or menu) when setting the watch by illumination of the digits or appliques 38 on the dial 3 and/or of small hidden texts and/or logos;
  - illumination of the ceramic winding button when it is pulled out to set the watch;
  - light guide indicating which button(s) and/or part(s) of the watch the user can/must touch in the next setting step. The buttons themselves and/or an area around the buttons can be illuminated;
  - light confirmation (for example using two or three light pulses) to indicate to the user that the settings have been accepted by the watch.

Figure 2:
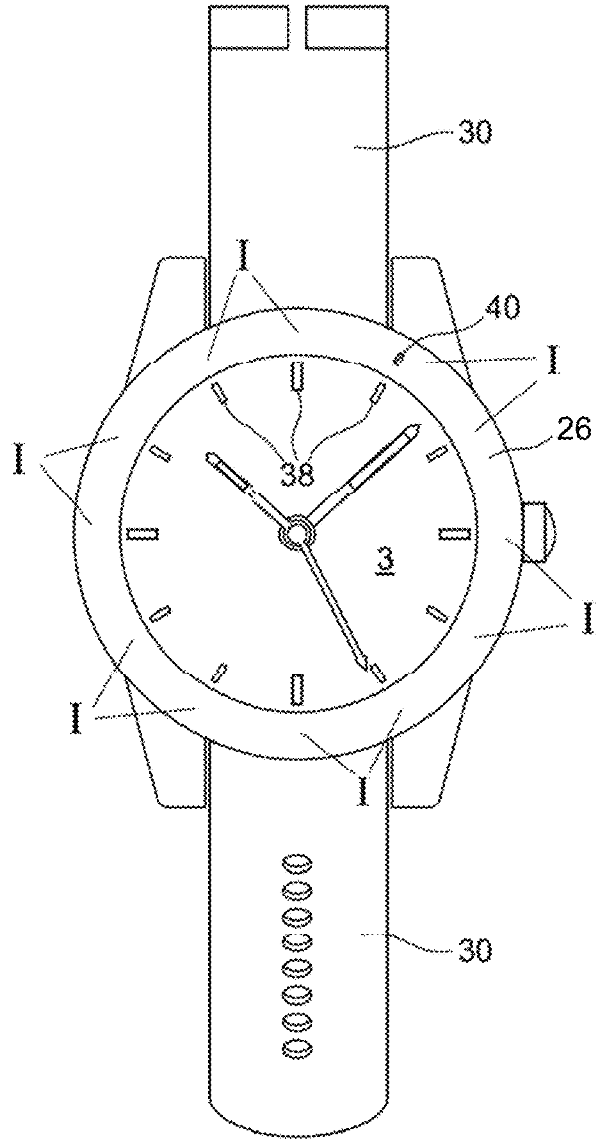
FIG. 2 is an overhead view of a wristwatch comprising a bezel on which a point illumination indicates the hour.

Another possible functional application for the timepiece according to the invention is shown in FIG. 2, where the timepiece is a wristwatch. On a point or quasi-point area 40 of the bezel 26 of the watch, a localised illumination indicates the hours, i.e. 1 o'clock in the example shown. The point or quasi-point area 40 corresponds in fact to the position of a digit or applique 38 on the dial 3 of the watch. The localised illumination in particular allows the hours to be read at night.

Figure 3:
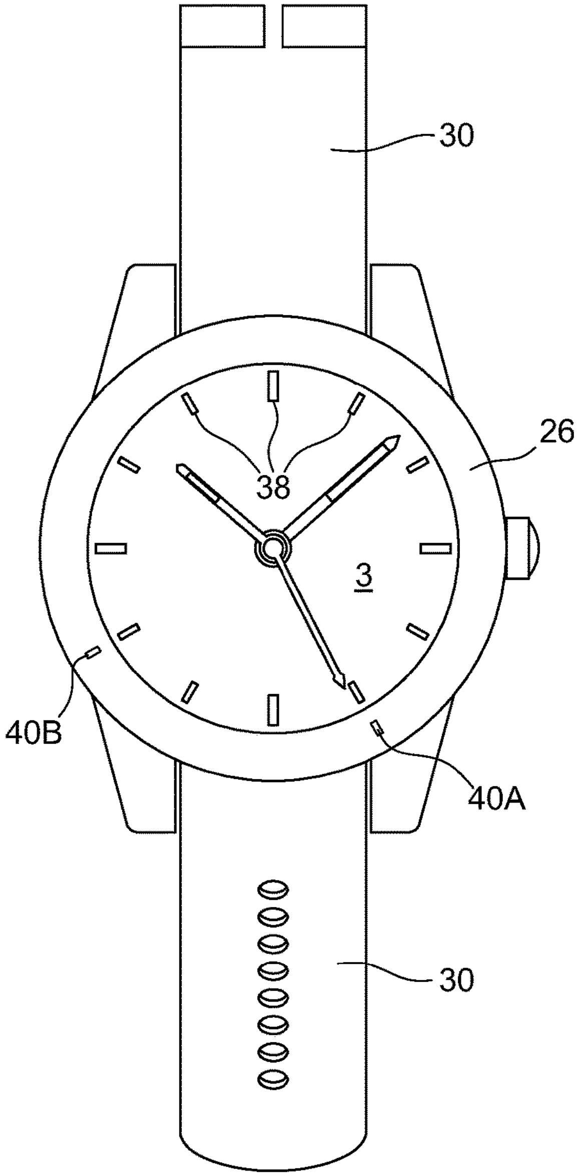
FIG. 3 is a view similar to that in FIG. 2, wherein two point illuminations on the bezel indicate the hour and the minutes.

Another possible functional application for the timepiece according to the invention is shown in FIG. 3, where the timepiece is a wristwatch. On a first point or quasi-point area 40A of the bezel 26 of the watch, a first localised illumination indicates the hours, i.e. 5 o'clock in the example shown. On a second point or quasi-point area 40B of the bezel 26 of the watch, a second localised illumination indicates the minutes, i.e. 40 minutes in the example shown. The second illumination (corresponding to the minutes) can be produced simultaneously with the first illumination (corresponding to the hour). The light colours on the first and second point or quasi-point areas 40A, 40B can be identical (in the case of sequential illuminations) or different (in the case of simultaneous illuminations). The latter case allows the user of the watch to distinguish between the hours and the minutes. The first and second localised illuminations in particular allow the hours and the minutes to be read at night.

Figure 4:
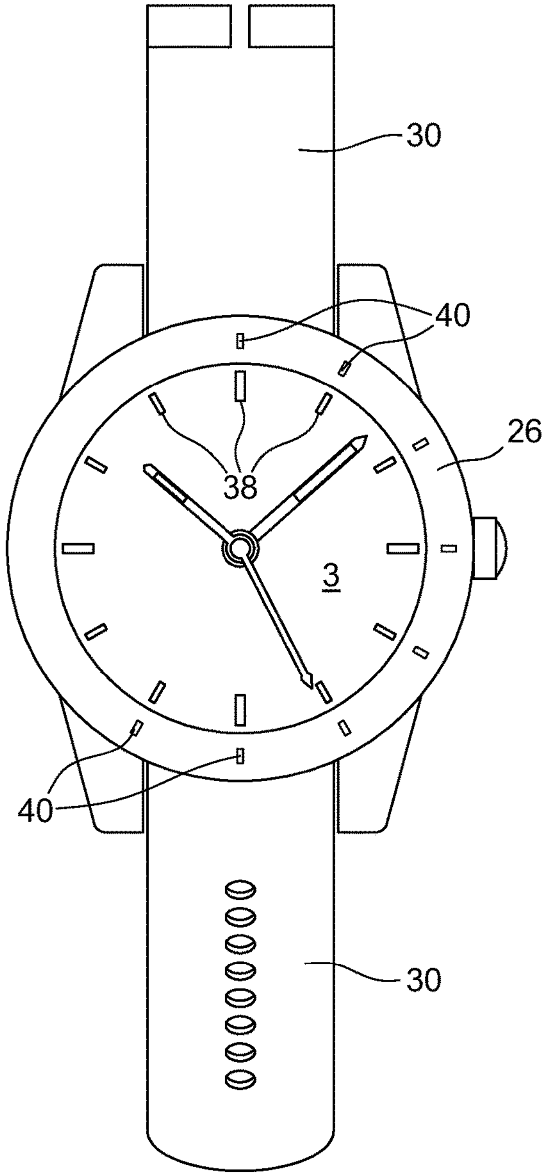
FIG. 4 is a similar view to that in FIG. 2, wherein a plurality of point illuminations on the bezel indicate a luminous countdown timer or stopwatch.

Another possible functional application for the timepiece according to the invention is shown in FIG. 4, where the timepiece is a wristwatch. On one or more point or quasi-point areas 40 of the bezel 26 of the watch, in this case on eight areas 40 in the example shown, a plurality of localised illuminations indicate a luminous countdown or stopwatch. The point or quasi-point areas 40 on the bezel 26 can light up or go out respectively as the time elapses.

In each of the example embodiments shown in FIG. 2 to 4, the timepiece typically includes twelve light-emitting diodes 10 mounted in series on a flexible printed circuit board 8. Each light-emitting diode 10 is mounted in or beneath the bezel 26 and is used to illuminate a point or quasi-point area 40 on the bezel 26.

Alternatively to the embodiments shown in FIG. 2 to 4, the point or quasi-point areas 40 of localised illumination can be provided on the periphery of the middle 1, rather than on the bezel 26.

Another possible functional application for the timepiece according to the invention, which is similar to that of FIG. 2 but not shown in the figures, consists of displaying the date via a localised illumination on a point or quasi-point area 40 of the bezel 26 of the timepiece. The point or quasi-point area 40 corresponds in fact to the position of a digit or applique 38 on the dial 3 of the watch. For dates beyond "12", the two digits of the day can be indicated sequentially, followed by the month (for example "2" then "3", then "1" for the $23^{rd}$ of January). A different light colour can be used for the day and month. The localised illumination in particular allows the date to be read at night.

It goes without saying that the above list of functional applications made possible by the timepiece according to the invention is not exhaustive and a person skilled in the art will be able to identify other functional applications.

The invention claimed is:

1. A timepiece comprising:

a crystal (34);

a plurality of external elements including a back (2), a middle (1), and a dial (3), wherein at least one external element of the plurality of external elements includes at least one part made of an at least partially transparent or translucent ceramic material; and at least two point light sources (10) releasing heat, each light source (10) being capable of being separately switched on/off and being disposed in or directly beneath said at least one external element comprising the ceramic material, each light source (10) producing light that passes through the ceramic material of said at least one external element, wherein each light source (10) is configured to produce localised light on a point or quasi-point area (40) of the ceramic material of the at least one external element concerned, so as to produce localised illumination on said at least one external element, and wherein at least one of the plurality of external elements comprises an inscription formed on a surface thereof configured to be visible when illuminated by the at least two point light sources (10) and configured to be invisible in a state in which the inscription is not illuminated by the at least two point light sources (10).

2. The timepiece according to claim 1, characterised in that each point light source (10) is a quantum box or dot.

3. The timepiece according to claim 1, characterised in that each point light source (10) is a light-emitting diode mounted on a printed circuit board (8).

4. The timepiece according to claim 1, characterised in that each point light source (10) is a light-emitting diode (10) which is a surface mount device SMD that is encapsulated and/or surface-welded.

5. The timepiece according to claim 1, characterised in that each point light source (10) is a light-emitting diode (10) which is a light-emitting diode chip on a printed circuit board.

6. The timepiece according to claim 1, characterised in that each point light source (10) is a light-emitting diode (10), and the timepiece further includes an electronic control circuit (12) for controlling the light-emitting diodes (10), said electronic control circuit (12) being configured to control each light-emitting diode (10) independently from the other diodes.

7. The timepiece according to claim 1, characterised in that each point light source (10) is disposed on an internal surface of the at least one external element to be illuminated.

8. The timepiece according to claim 1, characterised in that a thickness of the at least one external element to be illuminated is chosen such that each point light source (10) disposed in or directly beneath said at least one external element is invisible when the light source (10) is switched off.

9. The timepiece according to claim 1, characterised in that the at least one external element to be illuminated is the middle (1) of the timepiece, and in that the thickness of the middle (1) is comprised between 1 mm and 5 mm.

10. The timepiece according to claim 1, further comprising a bezel (26) and/or a push-button (16) and/or a winding button provided with a button cap, characterised in that the bezel (26) and/or the winding button and/or the button cap and/or the push-button (16) is another external element comprising at least one part made of an at least partially transparent or translucent ceramic material.

11. The timepiece according to claim 1, characterised in that the at least one external element to be illuminated includes an insert made of an at least partially transparent or translucent ceramic material, said insert being provided at one or more locations where light is intended to escape from within the timepiece, a remainder of the external elements being made of a material other than ceramic.

12. The timepiece according to claim 11, characterised in that each point light source (10) is configured to emit ultraviolet, violet, blue, white or infrared light, and in that the at least one external element to be illuminated is loaded with phosphorescent and/or fluorescent particles at the one or more locations where light is intended to escape from within the timepiece.

13. The timepiece according to claim 1, characterised in that the point light sources (10) are configured such that each point or quasi-point area (40) of the ceramic material that can be illuminated is capable of being illuminated by a single monochromatic point light source (10).

14. The timepiece according to claim 1, characterised in that the point light sources (10) are configured such that each point or quasi-point area (40) of the ceramic material that can be illuminated is capable of being illuminated by a plurality of point light sources (10) with different light colours.

15. Use of a timepiece according to claim 1, wherein a switching on and off of the point light sources (10) releasing heat is configured such that the timepiece has, on the at least one external element illuminated by the point light sources (10), at least one visual indication of a function specific to the timepiece and/or relating to a measurement of an external parameter or of a parameter concerning the user of the timepiece.

16. Use of a timepiece according to claim 15, characterised in that the switching on and off of the point light sources (10) is configured such that the timepiece has, on the at least one external element illuminated by the point light sources (10), one or more visual indications relating to one or more of the following functionalities: indication of the hour, minutes and/or date; indication of a stopwatch or a countdown timer with point or quasi-point luminous areas (40) of the external element which light up, or go out respectively, as the time elapses; indication of a quantity measured by the timepiece by colour-, rhythm-, frequency-and/or intensity-modulated illumination on the external element.

17. Use of a timepiece according to claim 15, characterised in that the switching on and/or off of the point light sources (10) is controlled simultaneously and/or sequentially.

* * * * *